(12) United States Patent
Gholmieh et al.

(10) Patent No.: US 10,009,144 B2
(45) Date of Patent: Jun. 26, 2018

(54) SYSTEMS AND METHODS FOR PRE-FEC METRICS AND RECEPTION REPORTS

(75) Inventors: Ralph A. Gholmieh, San Diego, CA (US); Gordon Kent Walker, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 1440 days.

(21) Appl. No.: 13/594,454

(22) Filed: Aug. 24, 2012

(65) Prior Publication Data

US 2013/0159457 A1    Jun. 20, 2013

Related U.S. Application Data

(60) Provisional application No. 61/576,338, filed on Dec. 15, 2011.

(51) Int. Cl.
*H04L 1/00* (2006.01)
*H04L 1/20* (2006.01)

(52) U.S. Cl.
CPC .......... *H04L 1/0019* (2013.01); *H04L 1/0009* (2013.01); *H04L 1/0017* (2013.01); *H04L 1/0035* (2013.01); *H04L 1/0045* (2013.01); *H04L 1/0001* (2013.01); *H04L 1/0025* (2013.01); *H04L 1/0026* (2013.01);
(Continued)

(58) Field of Classification Search
CPC .......... H04N 21/234363; H04M 3/304; H04L 43/0852; H04L 43/0817; H04L 1/0003; H04L 1/0002; H04L 1/0019; H04L 1/0045; H04L 1/0035; H04L 1/0017; H04L 1/0009; H04L 1/0001; H04L 1/0025; H04L 1/0057; H04L 1/203; H04L 1/0026; H04L 2001/0093; H04J 3/0632; G10L 19/005; G06F 17/30539

See application file for complete search history.

(56) References Cited

U.S. PATENT DOCUMENTS 7,376,173 B2    5/2008  Yedidia et al.
7,813,322 B2   10/2010  Laroia et al.
(Continued)

FOREIGN PATENT DOCUMENTS

CN    101030838 A    9/2007
EP      1453269 A1   9/2004
(Continued)

OTHER PUBLICATIONS

International Search Report and Written Opinion—PCT/US2012/068780—ISA/EPO—dated Jun. 7, 2013.
(Continued)

*Primary Examiner* — Le H Luu
(74) *Attorney, Agent, or Firm* — The Marbury Law Group

(57) ABSTRACT

Methods, systems and devices are provided for receiving, at a receiver device, a data block or file containing a plurality of application symbols, determining the number of application symbols received in the block, generating a metric based on the number of application symbols received in the block, and transmitting the metric to a server. The metric may further be generated based on a number of application symbols that were required to recover the block or file. The server may use the metric received from one or more receiver devices to adjust the transmission settings for additional data transmissions.

148 Claims, 8 Drawing Sheets

(52) U.S. Cl.
CPC ............ *H04L 1/0057* (2013.01); *H04L 1/203* (2013.01); *H04L 2001/0093* (2013.01)

(56) References Cited

U.S. PATENT DOCUMENTS

| | | | |
|---|---|---|---|
| 7,975,189 B2 | 7/2011 | Kose | |
| 2001/0055311 A1* | 12/2001 | Trachewsky | H04L 1/0003 370/445 |
| 2003/0007487 A1 | 1/2003 | Sindhushayana et al. | |
| 2003/0053548 A1* | 3/2003 | Lee | H04J 3/0632 375/259 |
| 2005/0071714 A1 | 3/2005 | Soga et al. | |
| 2006/0150055 A1 | 7/2006 | Quinard et al. | |
| 2007/0115814 A1* | 5/2007 | Gerla | H04L 1/0002 370/230 |
| 2008/0144519 A1* | 6/2008 | Cooppan | H04L 43/0817 370/252 |
| 2010/0110901 A1 | 5/2010 | Wong et al. | |
| 2010/0166051 A1* | 7/2010 | Chung | H04M 3/304 375/225 |
| 2010/0281338 A1 | 11/2010 | Liu | |
| 2011/0154145 A1 | 6/2011 | Lomnitz | |
| 2011/0202674 A1* | 8/2011 | Su | H04N 21/234363 709/231 |
| 2011/0296045 A1* | 12/2011 | Todd | H04L 43/0852 709/231 |
| 2012/0269354 A1* | 10/2012 | Doherty | G10L 19/005 381/56 |
| 2012/0327922 A1 | 12/2012 | Takahashi et al. | |
| 2013/0107741 A1* | 5/2013 | Huang | G06F 17/30539 370/252 |
| 2013/0263201 A1* | 10/2013 | Chung-How | H04L 1/0003 725/116 |

FOREIGN PATENT DOCUMENTS

| | | |
|---|---|---|
| EP | 1455547 A1 | 9/2004 |
| EP | 1788490 A1 | 5/2007 |
| EP | 2182666 A1 | 5/2010 |
| JP | 2980105 B1 | 11/1999 |
| JP | 2002330118 A | 11/2002 |
| JP | 2004349891 A | 12/2004 |
| JP | 2010118894 A | 5/2010 |
| WO | 2004075023 A2 | 9/2004 |
| WO | 2011148741 A1 | 12/2011 |
| WO | 2011151647 A2 | 12/2011 |

OTHER PUBLICATIONS

Partial International Search Report—PCT/US2012/068780—ISA/EPO—dated Mar. 5, 2013.

Qualcomm Incorporated: "Pre-FEC Repair QoE metrics", 3GPP Draft; S4-120608 Pre-FEC QoE Metrics, 3rd Generation Partnership Project (3GPP), Mobile Competence Centre; 650, Route Des Lucioles; F-06921 Sophia-Antipolis Cedex; France, vol. SA WG4, no. Erlangen, Germany; May 21, 2012-May 25, 2012, May 16, 2012 (May 16, 2012).

* cited by examiner

SYSTEMS AND METHODS FOR PRE-FEC METRICS AND RECEPTION REPORTS

RELATED APPLICATIONS

The present non-provisional patent application claims the benefit of priority to U.S. Provisional Application No. 61/576,338 entitled "Systems and Methods for Pre-FEC Metrics and Reception Reports," and filed Dec. 15, 2011, the entire contents of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to transmit a wide variety of content to mobile receiver devices, such as via broadcast and multicast services.

Wireless communication services utilize a variety of techniques to improve the quality of the user experience, including the use of Forward Error Correction (FEC) and reception reporting to provide feedback on the success or failure of files delivered over the wireless network. However, there is a continuing need to improve the quality of user experience in wireless communication.

SUMMARY

The various embodiments provide methods, systems and devices for receiving, at a receiver device, a data block containing a plurality of application symbols, determining the number of application symbols received in the block, generating a metric based on the number of application symbols received in the block, and transmitting the metric to a server. The server may use the metric received from one or more receiver devices to adjust the transmission settings for additional data transmissions. The various embodiments may report reception information regarding the transmission of certain types of files, a particular file or blocks that constitute a particular file.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
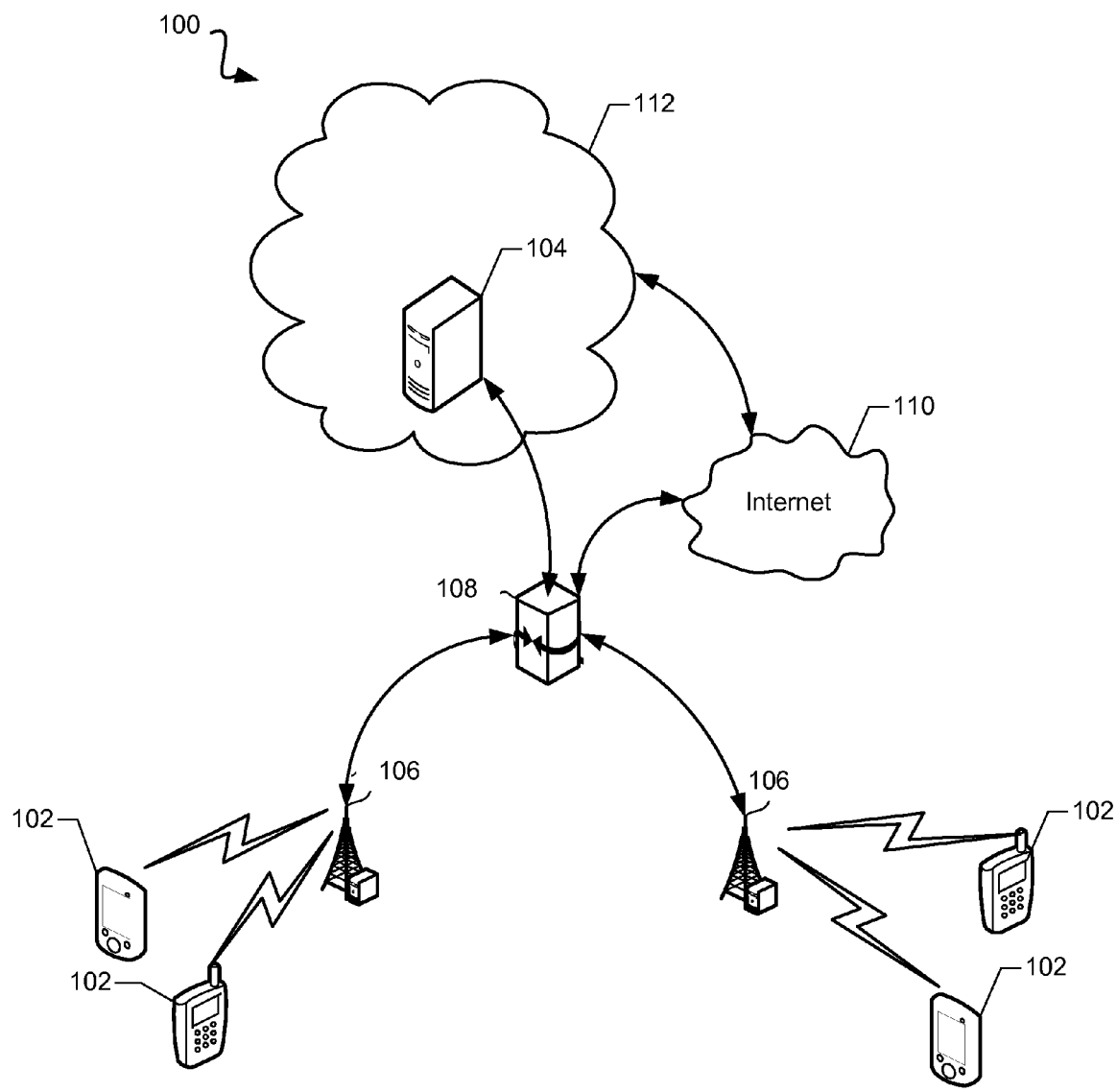
FIG. 1 is a communication system block diagram illustrating a mobile communication system suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of cellular telephones, personal data assistants (PDA's), laptop computers, smartbooks, palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and transceiver circuitry for sending and receiving wireless communication signals.

The word "broadcast" is used herein to mean the transmission of data (files, information packets, television programming, etc.) so that it can be received by a large number of receiving devices simultaneously, which includes multicast.

The word "unicast" is used herein to mean a wireless data transmission that is directed to a single receiver device.

A number of different cellular and mobile communication services and standards are available or contemplated in the future, all of which may implement and benefit from the various embodiments. Such services and standards include, e.g., 3rd generation partnership project (3GPP), long term evolution (LTE) systems, 3rd generation wireless mobile communication technology (3G), 4th generation wireless mobile communication technology (4G), global system for mobile communications (GSM), universal mobile telecommunications system (UMTS), 3GSM, general packet radio service (GPRS), code division multiple access (CDMA) systems (e.g., cdmaone, CDMA2000™), worldwide interoperability for microwave access (WiMAX), enhanced data rates for GSM evolution (EDGE), advanced mobile phone system (AMPS), digital AMPS (IS-136/TDMA), evolution-data optimized (EV-DO), digital enhanced cordless telecommunications (DECT), and integrated digital enhanced network (iden). Each of these technologies involves the transmission and reception of signaling and content messages. It should be understood that any references to terminology and/or technical details related to an individual standard or technology are for illustrative purposes only and are not intended to limit the scope of the claims to a particular broadcast communication system or technology unless specifically recited in the claim language.

As used herein, an "application symbol" is the smallest amount of data transmitted at a time, and may be a waveform, a state or a condition of the communication channel that persists for a fixed period of time. Application symbols may include packet symbols and/or sub-packet symbols and may be distinct from physical layer application symbol designations. For example, application symbols may include Raptor code application symbols. Each application symbol may represent an integer number of bits. In embodiments, an application symbol may be a certain number of bytes. As used herein, a "block" is a sequence of application symbols having a nominal length or size. A block may represent a portion of a larger object or file.

It is common in many wireless communication protocols to encode transmitted information in the form of application symbols which are organized into blocks which are transmitted together with common Forward Error Correction (FEC) encoding. Thus, files that are transmitted may be broken into blocks, with the information within the blocks encoded into application symbols which are transmitted and received. In some protocols, information from different portions of the file may be interleaved among a number of blocks. FEC encoding involves adding information to the transmission in the form of additional application symbols, the combined effect of which provides additional information that receiver devices use to recover lost application symbols. Depending upon the type or amount of FEC encoding used when transmitting the file, the process may increase the number of application symbols transmitted within each block by a factor of 1 to 3, for example. In some cases, such as in a non-systematic FEC, all of the application symbols in a block may be repair application symbols, which may be used by the receiver device to recover the original data during FEC. Thus, a transmission block will include more application symbols than would otherwise be required for the information included within the block. On the other hand, FEC methods enable receiver devices to recover all of the actual information in a block if a certain minimum number of the block application symbols are received. In the following description, the number of application symbols in a block is referred to as "k." The number of application symbols required to recover the file is at least k. For an ideal code such as the Reed-Solomon code, the number of application symbols required for recovery is k; for "good" codes the number of application symbols required to recover the block is slightly greater than k.

The various embodiments provide methods, systems and devices for providing reception reporting information that can be used to quickly determine quality of communication channels between transmitters and receivers in a wireless communication system based on statistics gathered by receiver devices, and to quickly optimize the transmission settings, such as Forward Error Correction (FEC) settings (e.g., FEC coding used and/or overhead) to ensure that a desired Quality of Service (QoS) is met in the wireless communication system. The embodiments provide mechanisms by which receiver devices report a metric regarding the relative degree to which network transmission settings are effectively delivering files to receiver devices. In other words, systems implementing the embodiments may generate a metric that reports how close application symbol reception is to the desired number of correct application symbols received in transmissions of data blocks and/or particular files. The metric may be based upon a number of application symbols actually received in attempted recovery of a block of transmission content, such as a ratio of or difference between the number of application symbols received and the number of application symbols in the block. Thus, the metric depends upon the block size and reflects the margin by which the block failed. In embodiments, the metric may provide a more useful overall measure of the channel between transmitters and receivers for network operators. This metric enables network operators to make an appropriate adjustment to optimize file delivery.

In the various embodiments, the generated metric may describe a transmission's level of success in delivering recovered application symbols to receiver devices, and differs from conventional error measuring concepts which focus on measuring bit and/or symbol error rates at the physical layer. Since application symbols may be represented in arithmetic code-space as vectors (i.e., coordinates having direction) that are transmitted from one end of a communication chain to another, such application symbol vectors may constitute many bits (or bytes) and/or symbols at the physical layer. The success of application symbol transmissions may not be equivalent to physical level bit and/or symbol error rates, and the metric may describe the reception of application symbols on a layer distinct from the physical delivery of bits. For example, many physical layer bit errors could cause application symbol errors, but error correction coding and techniques can recover application symbols even when many bits are lost at the physical layer. Therefore, application symbol correctness is determined by calculations unrelated to the physical layer (e.g., the distance of data block information to a correct or probable application symbol).

In the various embodiments, the metric may indicate the level of success in delivering correct application symbols for a particular file or files having certain characteristics (e.g., a certain file size) or of a particular file type. The metric may reflect the level of success in receiving a particular file made up of numerous data blocks, without incorporating considerations such as varying data rates and physical layer bit error rates. For example, a transmission may successfully deliver the particular file despite bit errors in the data channel. A system operator may use the metric to distinguish between files having similar characteristics and analyze application symbol reception for the similar files. For example, the system operator may use the metric received from a number of receiver devices to adjust error encoding schemes and/or redundancy for similarly sized files or the same file types in order to either improve reception by most receivers (e.g., when many devices report a large percentage of application symbols are being lost) or better utilize available bandwidth (e.g., when few devices are reporting poor metrics).

In embodiments, separate reception reporting schemes may be employed for different types of data transmission. For example, a first metric may be reported for file delivery in a download session (e.g., an eMBMS download session) where the reception reports are for a small number of received file(s), and a second metric may be reported in a download session involving a large number of small files delivered during the life of the session, an example of this being a Dynamic Adaptive Streaming over HTTP (DASH) download session.

Current reception reporting solutions are generally limited to information on whether an object or file has been correctly received at the receiver device, typically after FEC has been performed on the received data. While this information may be useful in notifying the sender of an object or file delivery failure, it does not tell the sender why there was a failure or by how much the transmission failed. The various embodiments collect information that may be used to assess the performance of the FEC, and which may be used to provide an improved user experience. For example, by providing a metric to the network operator that provides information regarding by how much transmissions are failing, the embodiments enable the network operator to better diagnose the problems and apply a most appropriate remedy, such as increasing FEC redundancy by a suitable increment versus decreasing the amount of information included in the transmission (e.g., degrading content).

Embodiment methods and systems may include receiving, at a receiver device, a data block containing a plurality of application symbols, determining the number (n) of application symbols received in the block, generating a metric based on the number of application symbols received in the block, and transmitting the metric to the network operator. The methods may be applied for all blocks or for those blocks of information which were not recovered (i.e., not accurately received). Receiver devices may report this metric to the network operator via a reverse channel or a separate unidirectional network (e.g., in the case of mobile broadcast networks). A server within the network may use the metric received from one or more receiver devices to adjust the transmission settings for subsequent data transmissions.

In embodiments, the receiver device may collect information for failed blocks on the number of received application symbols (n) and the total number of application symbols (k) in the block. The difference between the number of received block application symbols (n) and the total number of application symbols (k) is referred to herein as "application symbol underrun." Note that the device may fail to recover the file even when n-k is positive. In general, once n is greater is k, and as n increases, the probability of successful recovery of a block increases monotonically. In various embodiments, the receiver device may report the number of received application symbols (n) and the total number of application symbols (k) required to recover the block for failed blocks. Alternatively, the receiver may calculate and report a distribution of application symbol under runs for failed files, such as by calculating the difference between the number of received application symbols and the total number of application symbols for failed blocks (i.e., k−n). In a further alternative, receiver devices may calculate and report a percentage of the application symbol under run, such as by calculating a ratio between the number of received application symbols and the total number of application symbols required to recover a block for failed blocks or by calculating the application symbol underrun as a percentage (e.g., (k−n)/k). Some code classes require a certain number of additional received application symbols to achieve predictable decode probability. Transmission of these metrics to the network operator informs the operator about the sets or types of files that are failing (e.g., which file sizes, block sizes or file types) and by how much the files are failing. For example, a metric may provide application symbol reception information for a particular file having a particular file size which may the operator may use to adjust future transmission parameters of files having the same size. With this knowledge, the network operator may be able to better respond to improve reception performance, such as by adjusting FEC settings by a sufficient but not excessive (i.e., an efficient) amount. The operator may analyze the reception reports and quickly adjust the transmission settings, such as which FEC code is in use, how many repair application symbols to use, how much overhead is needed, etc. Configuring receiver devices to calculate and return the metric to the network operator on a frequent periodic basis enables network operators to dynamically adjust transmission and FEC settings in response to changes in transmission conditions and transmitted content, as well as in response to evolving network capability, e.g., the addition of sites may change the percentage overhead required.

The various embodiments may be implemented within a variety of wireless communication systems 100, an example of which is illustrated in FIG. 1. A wireless communication system 100 may be a Multimedia Broadcast Multicast Service (MBMS) system. In embodiments, the MBMS may be implemented in $3^{rd}$ Generation Project Partnership (3GPP) system, and may use a Universal Mobile Telecommunications System (UMTS) with a Universal Terrestrial Radio Access Network (UTRAN). The various embodiments may be generally applicable to message or block codes that have probabilistic or deterministic decode probabilities.

The communication system 100 may include a plurality of receiver devices 102, which may be configured to communicate via cellular telephone network, a radio access network (e.g., UTRAN, RAN, etc.), WiFi network, WiMAX network, and/or other well known technologies (e.g., GPRS, UMTS, LTE, cdmaOne, CDMA2000™). Receiver devices 102 may be configured to receive and transmit voice, data and control signals to and from a base station 106 (e.g., base transceiver station, NodeB, eNodeB, etc.), which may be coupled to a controller (e.g., cellular base station, radio network controller, service gateway, etc.) operable to communicate the voice, data, and control signals between mobile devices and to other network destinations. The base station 106 may communicate with an access gateway 108, which serves as the primary point of entry and exit of wireless device traffic, and may include one or more of a controller, a gateway, a serving gateway (SGW), a packet data network gateway (PGW), an evolved packet data gateway (ePDG), a packet data serving node (PDSN), a serving general packet radio service support node (SGSN), a policy and charging enforcement function (PCEF), or any combination of the features/functions provided thereof. The access gateway 108 may be implemented in a single computing device or in many computing devices, either within a single network or across a wide area network, such as the Internet.

The access gateway 108 may forward the voice, data, and control signals to other network components as user data packets, provide connectivity to external packet data networks, manage and store contexts (e.g. network internal routing information, etc.) and act as an anchor between different technologies (e.g., 3GPP and non-3GPP systems). The access gateway 108 may also coordinate the transmission and reception of data to and from the Internet 110, and the transmission and reception of voice, data and control information to and from an external service network connected to the Internet 110 and other base stations 106 and wireless receivers 102.

In embodiments, the access gateway 108 may be an MBMS gateway (MBMS GW), which may serve as an entry point for incoming broadcast/multicast traffic. The MBMS may be responsible for transmitting data packets to all base stations 106 (e.g., eNodeBs) within a service area, as well as MBMS session management. Embodiments may utilize eMBMS, which is MBMS applied in an LTE context.

The access gateway 108 may connect the receiver devices 102 to a service network 112. The service network 112 may control a number of services for individual subscribers, such as management of billing data and selective transmission of data, such as multimedia data, to a specific receiver device 102. The service network 112 may be implemented in a single computing device or in many computing devices, either within a single network or across a wide area network, such as the Internet 110. The service network 112 may typically include one or more servers 104.

In embodiments, the service network 112 may include a Broadcast Multicast Service Center (BM-SC), which is the functional entity providing the MBMS service to the receiver device 102. The BM-SC may provide the service via one or more servers 104. The BM-SC may serve as an entry point for content providers or any other broadcast/multicast source that is external to the network. The BM-SC may be responsible for providing authorization for receiver devices 102 requesting to activate an MBMS service, scheduling of broadcast and multicast sessions, integrity and confidentiality protection of MBMS data, and MBMS session announcement.

Following reception of files by the receiver device 102 over the communication system 100, which may be through point-to-multipoint bearers only, unicast bearers only, or using both point-to-multipoint and point-to-point bearers, a reception reporting procedure may be initiated by the receiver device 102 to a network server 104, which may be or may not be associated with a BM-SC.

Figure 2:
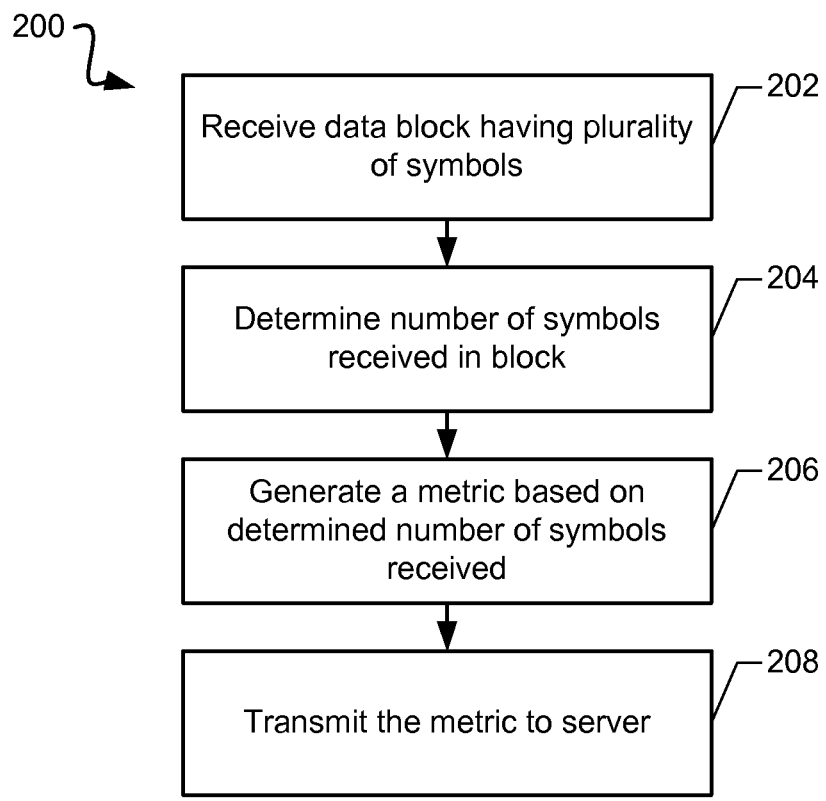
FIG. 2 is a process flow diagram illustrating an embodiment method for providing reception reporting information from a receiver device to a server in a communication system.

FIG. 2 is a process flow diagram illustrating an embodiment method 200 for providing reception reporting information from a receiver device 102 to a server 104 in a communication system 100. The receiver device 102 may receive a data block having a plurality of application symbols in operation 202. The data block may be received as part of a download delivery session. The receiver device 102 may determine the number of application symbols received in the block (i.e., n) in operation 204. In operation 206, the receiver device 102 may generate a metric based on the number of successfully received application symbols n. As part of operation 206, the receiver device may also determine the number of application symbols in the block, k, particularly for blocks it was not able to recover (i.e., failed blocks). The generated metric may include the block received application symbol count, n, the number of application symbols in the block, k, or a computed metric based on these two factors, such as a computed application symbol underrun (i.e., the difference between the received application symbols and the total number in the block), a distribution of block application symbol underruns, a ratio and/or a percentage of block application symbol underruns, as described in further detail below. The receiver device 102 may transmit the generated metric to a server 104 in operation 208.

In embodiments suitable for when the wireless network implements a download delivery method, such as MBMS download delivery, the reception reporting procedure may be used to report the complete reception of one or more files, to report statistics on the download session, or to do both. For a streaming delivery method, the reception reporting procedure may be used to report statistics on the stream. The server 104 (e.g., a BM-SC server) may transmit to the receiver device 102 parameters requiring reception reporting confirmation, and the receiver 102 may report the content reception in accordance with the transmitted parameters. The server 104 may specify a percentage subset of receivers 102 for which it would like to perform reception reporting, for example for statistics gathering purposes. Transport errors may prevent a receiver 102 from deterministically discovering whether the reception reporting associated delivery procedure is described for a session, and even if this is successful whether a sample percentage is described. In embodiments, the receiver device 102 may behave according to the information it has even when it is aware that this may be incomplete. In embodiments, the receiver 102 may utilize a default reporting procedure when a procedure is not specified by the server 104 or when a specified procedure is not known due to transport errors, etc.

The reception reporting may further include reporting of location information by the receiver device 102 at the time the reception reporting metric was generated. Thus, if there is a problem in the network, the location information may be used by the network operator to indicate where in the network the problem is occurring. The location information may be transmitted with the metric based on the number of successfully received application symbols n. The location information may be generated using any suitable technique, and may be based on GPS data, cell tower ID information, triangulation among multiple cell towers, etc. In embodiments, the location information may be determined by the communication system 100 without the involvement of the receiver device 102. In embodiments, the location information may be reported in a manner which conceals the identity of the receiver device 102. In some embodiments, the receiver device 102 may have the option to "opt out" of location information reporting.

Figure 3:
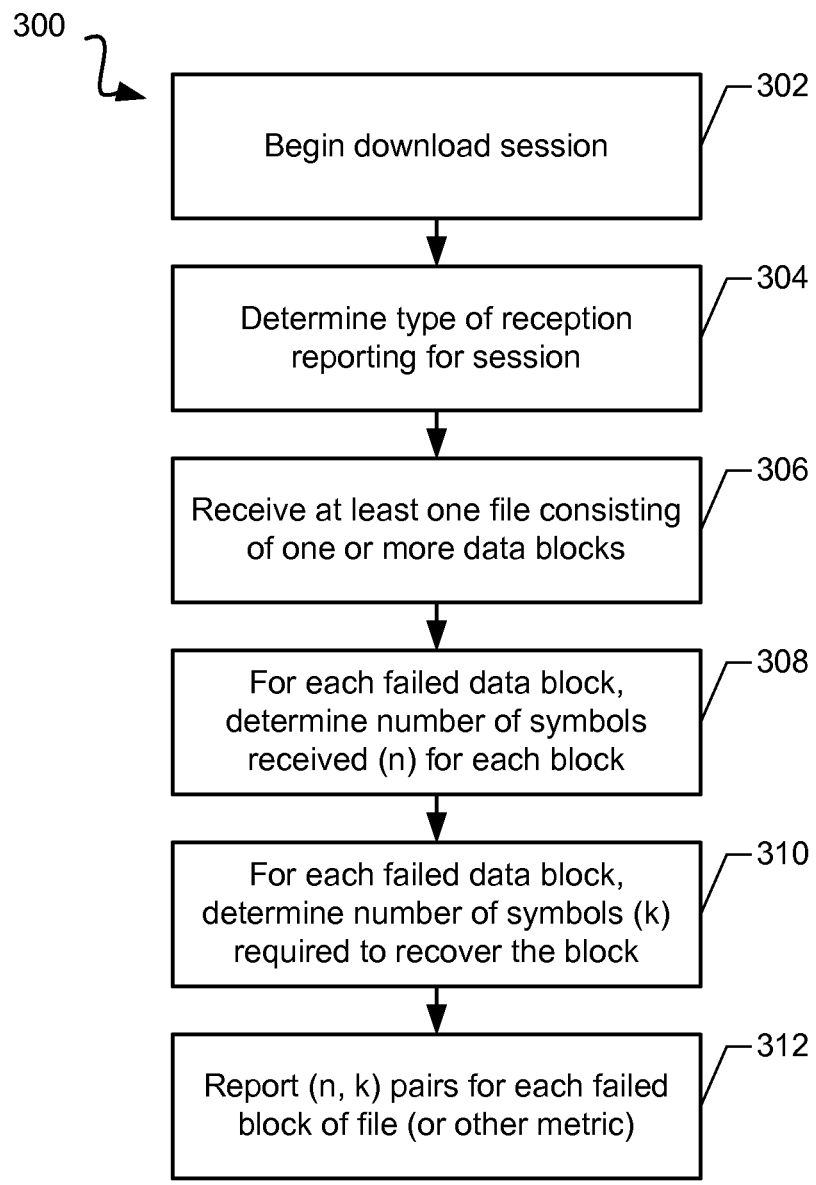
FIG. 3 is a process flow diagram illustrating an embodiment method of providing reception reporting information using a first reception reporting mode that includes collecting and reporting application symbol counts per file received.

FIG. 3 illustrates an embodiment method 300 of providing reception reporting information using a first reception reporting mode that includes collecting and reporting application symbol counts per file. In one embodiment, every file received over a download delivery session may be acknowledged, and in the case where a file fails (before unicast fallback, if any), a plurality of (n, k) pairs for failed blocks may be collected and reported to the server 104. This reception metric reporting mode may be used in particular for downloading of large files, such as video or audio files, which may be transmitted on a relatively infrequent basis. The reception report request from the server 104 may contain specific requirements on the report back period.

The receiver device 102 may begin a download session in operation 302. The receiver device 102 may determine the type of reception reporting for the download session in operation 304. The determination may include, for example, that there is a need to report reception and, if so, the mode of reporting that is specified. These may be specified, for example, in a delivery procedure description of the session announcement transmitted from the server 104 to the receiver device 102 when establishing the download session. In the embodiment method 300, the device 102 may determine that the reception reporting for the session includes a first reception reporting mode including collection and reporting of one or more of the application symbol count metrics as described herein.

In operation 306, the receiver device 102 receives at least one file consisting of one or more data block. For each failed data block in the download session (i.e., each data block that is not successfully recovered), in operation 308 the receiver device 102 may determine the number of application symbols received (n) for each failed block. In operation 310, the receiver device 102 may determine the total number of application symbols (k) that constitute the failed block. In the case of non-systematic codes, k=ceil (FileSize/Application symbolSize). These two values, n and k, may be logged for each failed block in the download delivery session. Alternatively, the receiver device may use these two values, n and k, to calculate a single metric, such as average values for each of n and k over a period of time or number of blocks, a difference or average difference between the two values, a ratio or average ratio of the two values, or a percentage or average percentage of the number of received application symbols to required application symbols as discussed above. In operation 312, the receiver device 102 may report to the server 104 the (n, k) pairs, averages of these values, and/or a calculated metric. In embodiments, the receiver device 102 may report this data at the conclusion of the file transmission, when the transmission of the file fails, when blocks are not recovered, periodically during the download transmission, or at times or intervals requested by the transmission network (e.g., in the delivery procedure description). The receiver device 102 may also report location information, as described above.

The application symbol count metrics reported in accordance with this embodiment method 300 may be used by the server or network operator to adjust transmission settings and/or file transmission settings in order to improve QoS over the communication network. For example, the application symbol count metrics may reveal in the number of application symbols in blocks (k) that a main issue in delivery failure is associated with the file sizes. The network operator may adjust network settings for that file sizes to meet target performance on the network based on this information. Previously, such adjustments have been made through trial-and-error, which is generally a lengthy and inefficient process.

Figure 4:
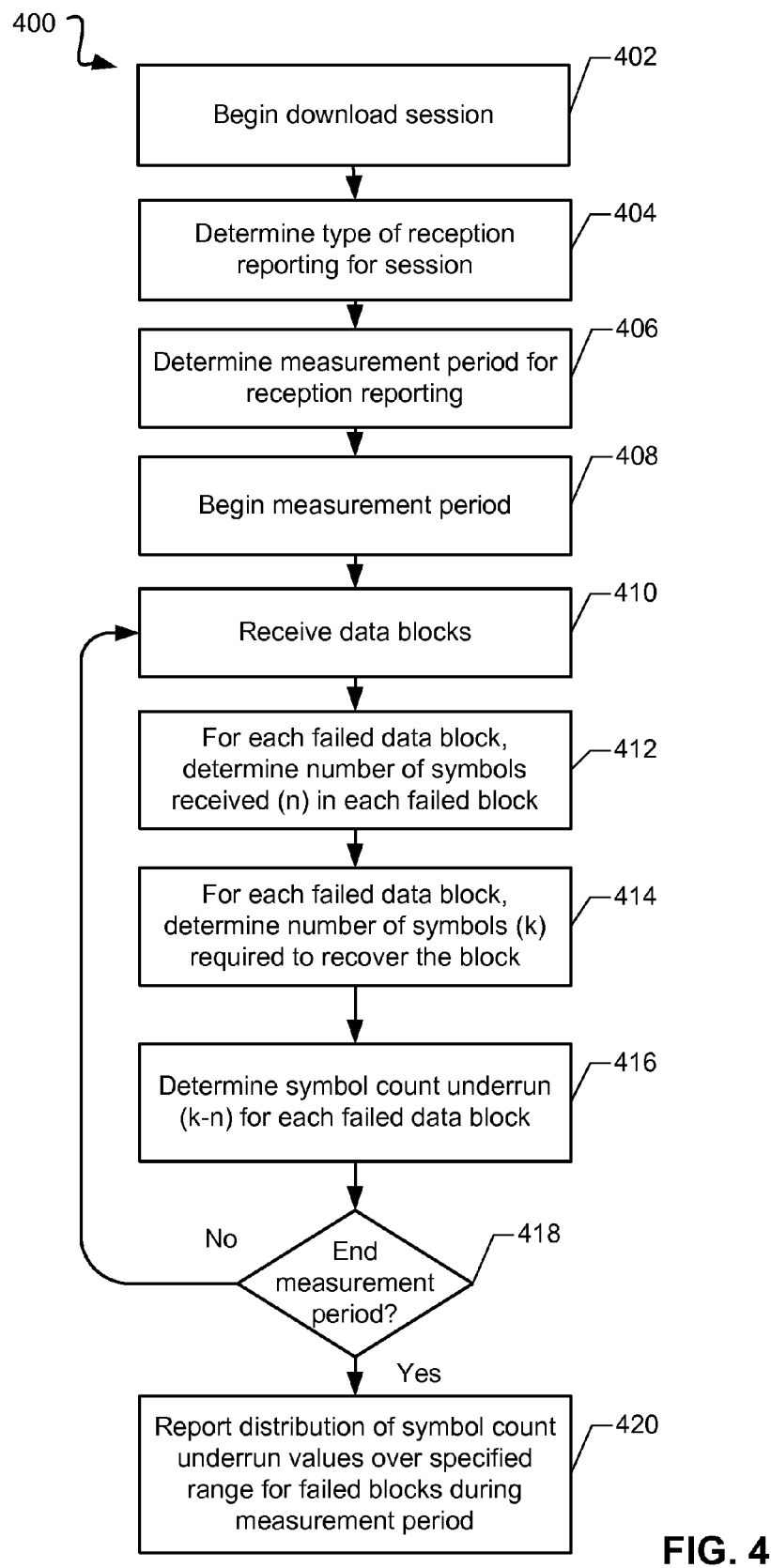
FIG. 4 is a process flow diagram illustrating an embodiment method of providing reception reporting information using a second reception reporting mode that includes reporting application symbol count statistics over a measurement period.

FIG. 4 illustrates an embodiment method 400 of providing reception reporting information using a second reception reporting mode that includes reporting application symbol count statistics. This reception reporting mode may be utilized in particular during a download delivery session in which a large number of small files (e.g., DASH segments) are transmitted to the receiver device 102. This reception reporting mode may be used, for example, in connection with an HTTP-streaming protocol, and may be utilized in connection with the Dynamic Adaptive Streaming over HTTP (DASH) standard.

The receiver device 102 may begin the download session in operation 402. In operation 404, the receiver device 102 may determine the type of reception reporting specified for the session. The determination may include, for example, that there is a need to report reception and, if so, the mode of reporting to use. The reporting mode may be specified, for example, in a delivery procedure description transmitted from the server 104 to the receiver device 102 when establishing the download session. In the embodiment method 400, the device 102 may determine that the reception reporting for the session includes a second reception reporting mode that includes collection and reporting of application symbol reception statistics.

The receiver device 102 may determine a measurement period for reception reporting in operation 406. The measurement period may be variable over different download sessions, or even within a single download session. In an embodiment, the measurement period may be specified in the delivery procedure description transmitted from the server 104 to the receiver device 102. The receiver device 102 may begin the measurement period in operation 408.

During the measurement period, the receiver device 102 may receive data blocks at operation 410. The data blocks may form part or all of a file, such as a segment of a media object (e.g., video, audio, etc.) which may be delivered to the receiver device and played or otherwise experienced "on-the-fly." The data blocks may be delivered to the receiver device 102 via DASH or HTTP-streaming, for example. Since the receiver device 102 may receive a large number of files (e.g., DASH segments) in a short time period (e.g., more than 1 per second), it may not be practical for the device 102 to log and report the application symbol count for each failed file. To address this challenge, the embodiment method 400 may include generating application symbol count statistics and reporting the statistics to the server 104.

As in embodiment method 300 shown in FIG. 3, the receiver device 102 may determine the number of application symbols received (n) and identify data blocks that were not successfully received or the number of application symbols (k) in each failed data block in operations 412 and 414, respectively. In embodiment method 400, the receiver device 102 may determine the application symbol count underrun for each failed block in operation 414. The application symbol count underrun may be calculated by subtracting the number of application symbols received from the number of application symbols in each failed data block (i.e., k−n). During the measurement period (i.e., while determination operation 418="No"), the device 102 may continue to receive data blocks and determine the application symbol count underrun for any failed blocks. At the end of the measurement period (i.e., when determination operation 418="Yes"), the device 102 may report to the server 104 a summary, average or distribution of application symbol count overrun values for all failed blocks during the measurement period in operation 420. Thus, the receiver device may transmit a distribution of application symbol count underrun values for files received during a specified measurement period. The receiver device 102 may also report location information, as described above. In embodiments, the distribution may be reported as a string list of (value of application symbol underrun, number of occurrences, etc.) pairs. In some embodiments, the distribution may be reported over a specified range of application symbol underrun values. Values greater than the top of the specified range may be reported as a specified maximum value. Values lower than the bottom of the range may be reported as a specified minimum value. In various embodiments, the application symbol underrun values may be used to generate composite metrics (e.g., averages, ratios, percentages, etc.) as described herein. In embodiments, the application symbol underrun values may be consolidated into bins, which may be useful for large ranges of application symbol underrun values.

In some embodiments, the distribution of application symbol underrun values may be collected and reported for at least one file size range. For example, in one embodiment, the distribution metric may only be reported for files within specified minimum and maximum file size values. In other embodiments, the device 102 may report separate distributions of application symbol underrun values for multiple different file size ranges.

In embodiments, the receiver device 102 may report the time required to nominally deliver a single instance of the file or a range of delivery times. This information may be analogous to the range of file sizes being received.

In yet further embodiments, the distribution of application symbol underrun values may be collected and reported per the type of file delivered. For example, the distribution metric may only be reported for certain types of files (e.g., video, audio, etc.), or may be reported separately for different file types. The device 102 may also use different parameters in calculating the distribution metric for different file types. For example, the device 102 may use different range (s) of application symbol underrun values and/or different file size parameters for reporting delivery metrics for different types of files.

In an embodiment, when receiving a file comprising a plurality of data blocks each comprising a plurality of application symbols, the device may identify data blocks that were not successfully received, determine the number of application symbols received in the file by determining the number of application symbols received in each data block that was not successfully received, and generating a metric based on the number of application symbols received in the file by generating the metric based on the number of application symbols received in each data block that was not successfully received. In this embodiment, generating the metric may include determining an application symbol count underrun percent value of $(k-n)/k$ for each failed block and related object size range in application symbols. This embodiment may further include determining a total number of application symbols in each data block that was not successfully received, in which generating the metric based on the number of application symbols received in each data block that was not successfully received involves generating the metric based on the number of application symbols received and the total number of application symbols in each data block that was not successfully received. Alternatively, generating a metric may include logging pairs of n and k for each data block that was not successfully received, and transmitting the metric may involve transmitting pairs of (n, k) values for each data block that was not successfully received. Alternatively, generating a metric may involve determining an application symbol count underrun value of $(k-n)$ for each failed block.

Instead of reporting application symbol underrun metrics on a per block or average block basis, the metrics may be reported on a per file basis. In such embodiments, the total number of application symbols received and the total number of application symbols may be reported on a per file basis. In an embodiment, the total number of application symbols received and the total number of application symbols over a period of time of statistics collection (e.g., five minutes) may be reported, or used to generate a composite metric, such as difference, ratio or percentage. Such reporting over an entire file or over a long period of time will yield an average metric, similar to averaging over a large number of blocks statistics or metrics gathered on a per-block basis.

The device 102 may continue to report distributions of application symbol count overrun values over additional measurement periods until the download delivery session is terminated.

Figure 5:
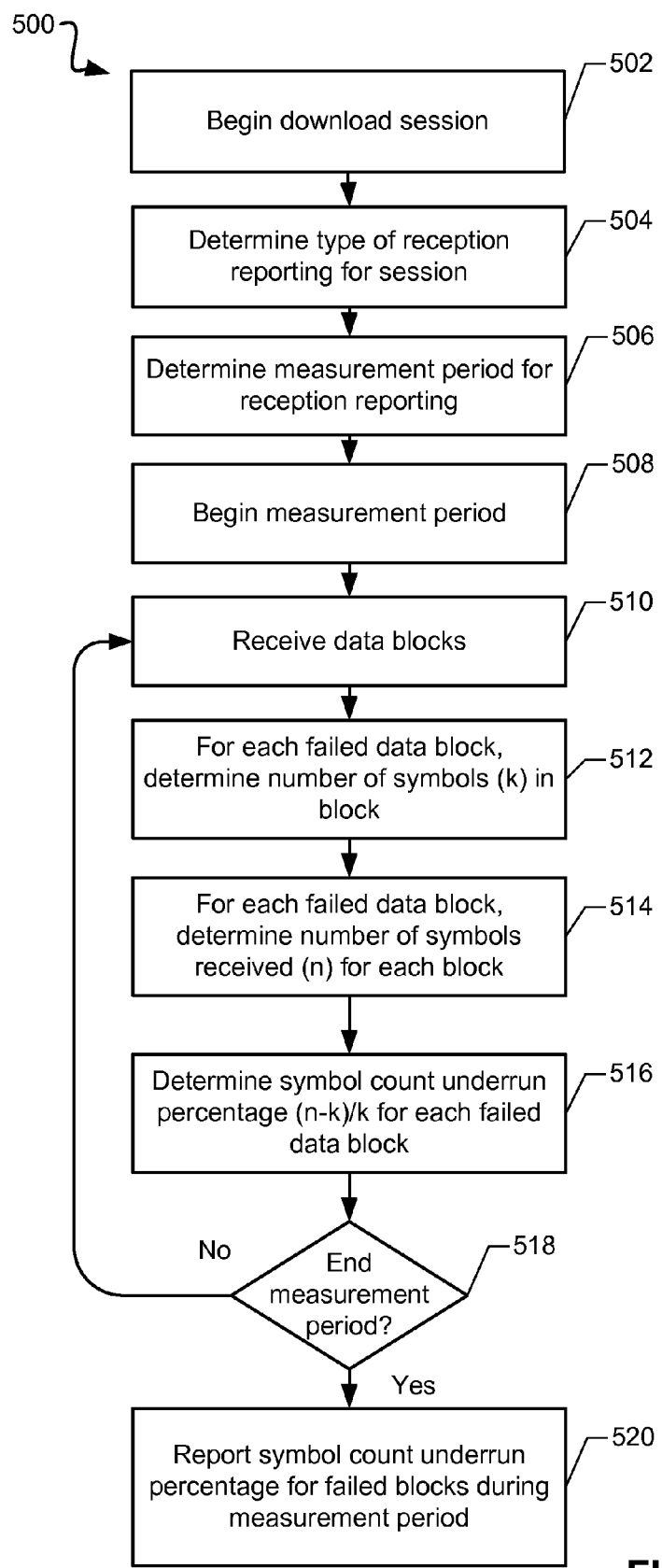
FIG. 5 is a process flow diagram illustrating an embodiment method of providing reception reporting information using a third reception reporting mode that includes reporting application symbol count percentage.

FIG. 5 illustrates an embodiment method 500 of providing reception reporting information using a third reception reporting mode that includes reporting application symbol count statistics including a percentage of application symbol count underrun. Blocks 502-514 and 518 of embodiment method 500 may be identical to blocks 402-414 and 418 of embodiment method 400. However, rather than determining and reporting the application symbol count underrun value, in embodiment method 500 the receiver device 102 may determine an application symbol count underrun percentage (i.e., $(k-n)/k\times100\%$), for each failed data block in operation 516. In operation 520, the receiver device 102 may report the application symbol count underrun percentage for failed blocks during the measurement period. The device 102 may report the underrun percentage as a distribution of percentage values for failed blocks, similar to method 400, or as a list of percentage values for all failed blocks, or as a cumulative underrun percentage value for all failed blocks in a measurement period. The receiver device 102 may also report location information, as described above.

Further embodiments include alternative operations for generating metrics and distributions of applications symbol underrun values. In an embodiment, transmitting the metric may include calculating and transmitting a distribution of application symbol count underrun values for data blocks not successfully received during a specified measurement period.

In another embodiment, transmitting a distribution of application symbol count underrun values may include transmitting the distribution over a specified range between a maximum application symbol count underrun value and a minimum application symbol count underrun value. In this embodiment, the distribution of application symbol count underrun values exceeding the maximum value may be reported at the maximum value and application symbol count underrun values below the minimum value are reported at the minimum value.

In another embodiment, transmitting a distribution of application symbol count underrun values may include restricting the distribution samples to failed blocks in a specified range of file sizes received. In this embodiment, transmitting a distribution of application symbol count underrun values may include transmitting a plurality of distributions, wherein each distribution corresponds to a different range of file sizes received.

In another embodiment, transmitting a distribution of application symbol count underrun values may include transmitting the distribution for a particular type of file received. In this embodiment, transmitting a distribution of application symbol count underrun values comprises transmitting a plurality of distributions, wherein each distribution corresponds to a different type of file received.

In an embodiment, generating a metric may include determining an application symbol count underrun percent value of $(k-n)/k$ for each failed block and related object size range in application symbols.

In a further embodiment, the metric may be generated for a particular data file containing a plurality of application symbols. In the embodiment, generating the metric may involve determining a number of application symbols received (n) in the file, determining a total number of application symbols transmitted (k) in the file, and generating the metric based on the number of application symbols received in the file. Similar to the other embodiments, this metric may then be transmitted to a server of the broadcaster. In this embodiment, generating the metric based on the number of application symbols received may involve generating the metric based on the number of application symbols received (n) and the total number of application symbols (k) in the entire file or during a specified period of time. The specified period of time or range of times may be defined in a service announcement associated with or included in the file transmission. In this embodiment, generating the metric may include logging pairs of n and k for the entire file or during the specified period of time, and transmitting the metric may involve transmitting pairs of (n, k) values for the entire file or during the specified period of time. In this embodiment, generating the metric may include determining an application symbol count underrun value of $(k-n)$ for the entire file or during the specified period of time, and the device may transmit a distribution of application symbol count underrun values for the entire file or during the specified period of time. Alternatively, transmitting a distribution of application symbol count underrun values may include transmitting the distribution over a specified range between a maximum application symbol count underrun value and a minimum application symbol count underrun value.

Figure 6:
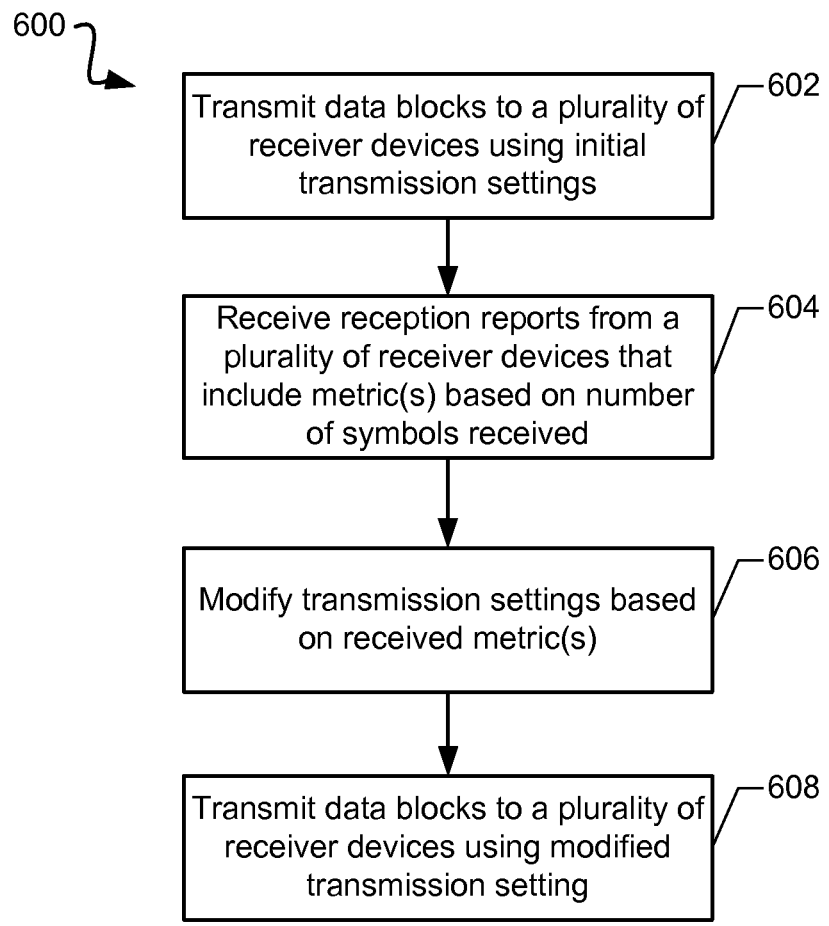
FIG. 6 is a process flow diagram illustrating an embodiment method of transmitting data from a server to a plurality of receiver devices using a communication system.

FIG. 6 illustrates an embodiment method 600 of transmitting data blocks from a server 104 to a plurality of receiver devices 102 using a communication system 100 which leverages received application symbol underrun metrics to improve transmission services. The server 104 may transmit data blocks to a plurality of receiver devices 102 using initial transmission settings in operation 602. The transmission setting may include, for example, the FEC coding scheme, the size of the data blocks, the overhead used, etc. In operation 604, the server 104 may receive reception reports from a plurality of receiver devices 102. The reception reports may include metric(s) based on the number of application symbols received, and may include any of the metrics described above in connection with the various embodiments. Based on these metrics, which may be analyzed by the server 104, the server 104 may modify the transmission settings in operation 606. For example, the server 104 may change the FEC coding scheme or add additional overhead for all file transmissions or for certain subset(s) of file transmissions (e.g., for certain file sizes, file types, etc.). The server 104 may then transmit data blocks to a plurality of receiver devices 102 using the modified transmission settings in operation 608.

Figure 7:
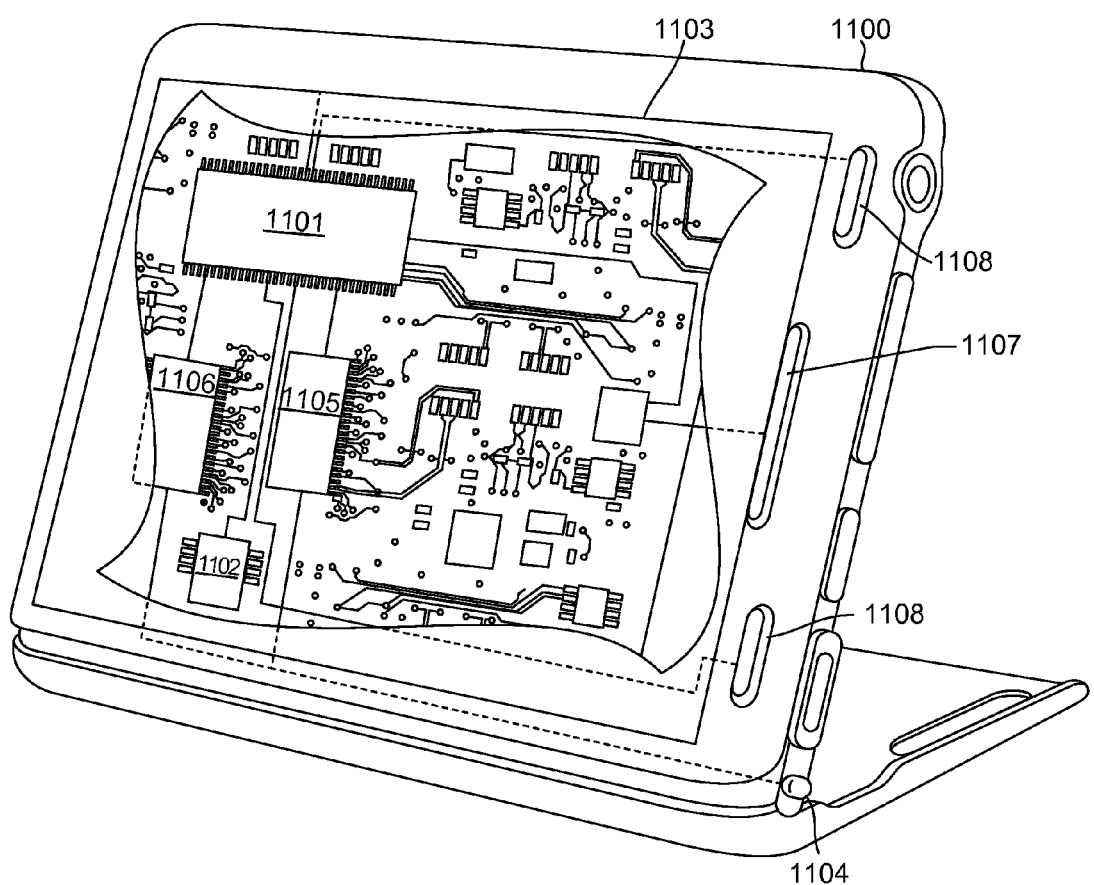
FIG. 7 is a system block diagram of a receiver device suitable for use with any of the embodiments.

FIG. 7 is a system block diagram of a receiver device suitable for use with any of the embodiments. A typical receiver device 1100 may include a processor 1101 coupled to internal memory 1102, to a display 1103, and to a speaker 1108. Additionally, the receiver device 1100 may include an antenna 1104 for sending and receiving electromagnetic radiation that may be connected to a wireless data link and/or cellular telephone transceiver 1105 coupled to the processor 1101 and a mobile multimedia broadcast receiver 1106 coupled to the processor 1101. The transceiver 1105 may be configured to establish a wireless data link to a network to enable the receiver device to communicate with a distant server via the Internet. Receiver devices 1100 typically also include menu selection buttons 1107 or rocker switches for receiving user inputs.

Figure 8:
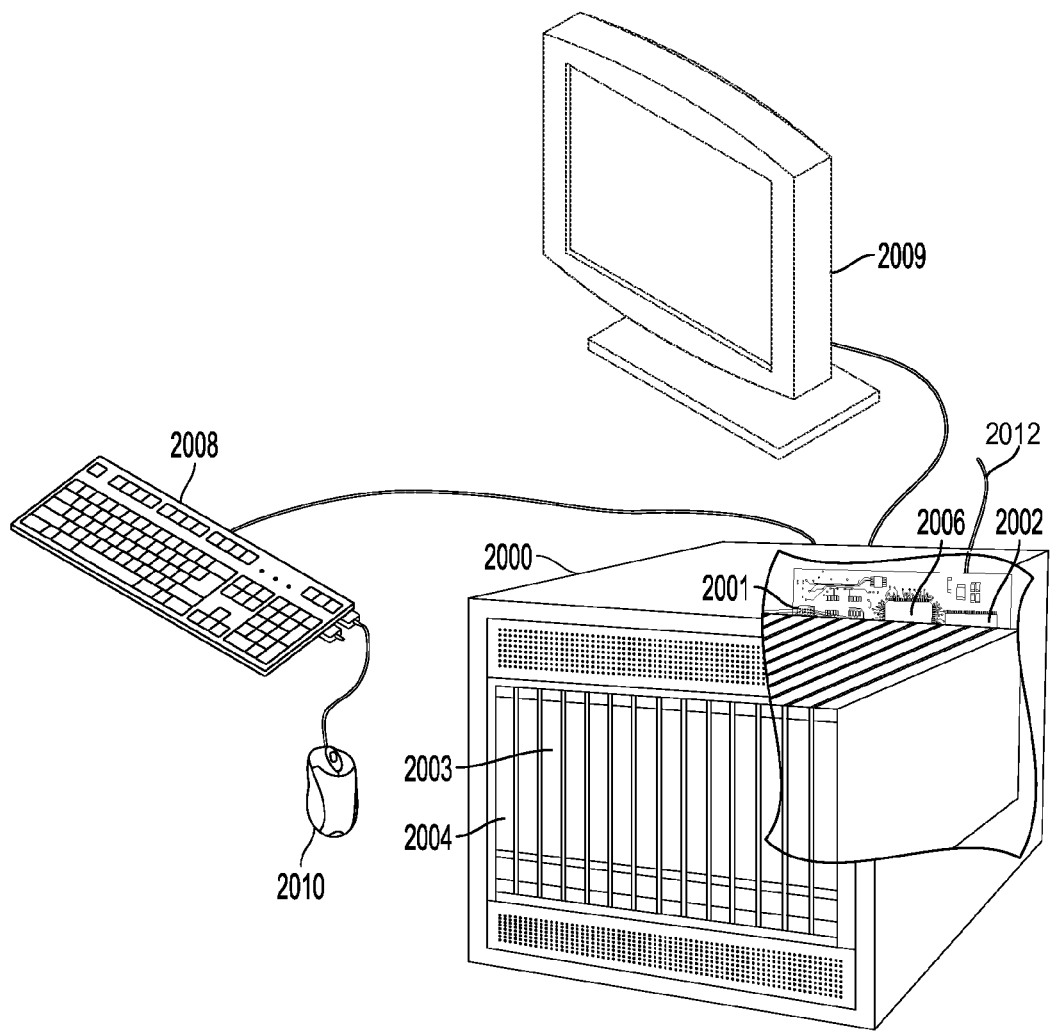
FIG. 8 is a system block of a server suitable for use with any of the embodiments.

The various embodiments may be implemented on the data transmission side on any of a variety of commercially available server devices, such as the server 2000 illustrated in FIG. 8. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network 2012, such as a local area network coupled to other broadcast system computers and servers. Servers 2000 may also include operator interfaces, such as a keyboard 2008, pointer device (e.g., a computer mouse 2010), and a display 2009.

The processors 1101, 2001 may be any programmable microprocessor, microcomputer or multiple processor chip or chips that can be configured by software instructions (applications) to perform a variety of functions, including the functions of the various embodiments described below. In some mobile receiver devices, multiple processors 2001 may be provided, such as one processor dedicated to wireless communication functions and one processor dedicated to running other applications. Typically, software applications may be stored in the internal memory 1102, 2002, 2003 before they are accessed and loaded into the processor 1101, 2001. The processor 1101, 2001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing reception reporting information in a wireless communication system, comprising:
    receiving a plurality of application symbols within a file transmitted by the wireless communication system;
    determining a number (n) of application symbols received in the file and a total number (k) of applications symbols transmitted in the file;
    generating a metric based on the number (n) of application symbols received in the file and the total number (k) of applications symbols transmitted in the file; and
    transmitting the metric to a server.

2. The method of claim 1, further comprising:
    transmitting location data to the server in association with the metric.

3. The method of claim 1, wherein generating the metric comprises logging pairs of n and k for the file.

4. The method of claim 1, wherein generating the metric comprises determining an application symbol count underrun value of (k−n) for the file.

5. The method of claim 4, wherein transmitting the metric comprises transmitting a distribution of application symbol count underrun values for files received during a specified measurement period.

6. The method of claim 5, wherein transmitting the distribution of application symbol count underrun values comprises transmitting the distribution over a specified range between a maximum application symbol count underrun value and a minimum application symbol count underrun value.

7. The method of claim 6, wherein in the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

8. The method of claim 5, wherein transmitting the distribution of application symbol count underrun values comprises transmitting a plurality of distributions, wherein each distribution corresponds to a different range of file sizes received.

9. The method of claim 5, wherein transmitting the distribution of application symbol count underrun values comprises transmitting the distribution for a particular type of file received.

10. The method of claim 9, wherein transmitting the distribution of application symbol count underrun values comprises transmitting a plurality of distributions, wherein each distribution corresponds to a different type of file received.

11. The method of claim 1, wherein the file is comprised of a plurality of data blocks each comprising a plurality of application symbols, and the method further comprises:
    identifying data blocks that were not successfully received, and wherein:
        determining the number of application symbols received in the file comprises determining the number of application symbols received in each data block that was not successfully received; and
        generating the metric based on the number of application symbols received in the file comprises generating the metric based on the number of application symbols received in each data block that was not successfully received.

12. The method of claim 11, wherein generating the metric comprises determining an application symbol count underrun percent value of (k−n)/k for each failed block and related object size range in application symbols.

13. The method of claim 11, further comprising:
    determining a total number of application symbols in each data block that was not successfully received,
    wherein generating the metric based on the number of application symbols received in each data block that was not successfully received comprises generating the metric based on the number of application symbols received and the total number of application symbols in each data block that was not successfully received.

14. The method of claim 11, wherein generating the metric comprises logging pairs of n and k for each data block that was not successfully received, and wherein transmitting the metric comprises transmitting pairs of (n, k) values for each data block that was not successfully received.

15. The method of claim 11, wherein generating the metric comprises determining an application symbol count underrun value of (k−n) for each failed block.

16. The method of claim 15, wherein transmitting the metric comprises transmitting a distribution of application symbol count underrun values for data blocks not successfully received during a specified measurement period.

17. The method of claim 16, wherein transmitting the distribution of application symbol count underrun values comprises transmitting the distribution over a specified range between a maximum application symbol count underrun value and a minimum application symbol count underrun value.

18. The method of claim 17, wherein in the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

19. The method of claim 16, wherein transmitting the distribution of application symbol count underrun values comprises restricting distribution samples to failed blocks in a specified range of file sizes received.

20. The method of claim 19, wherein transmitting the distribution of application symbol count underrun values comprises transmitting a plurality of distributions, wherein each distribution corresponds to a different range of file sizes received.

21. The method of claim 16, wherein transmitting the distribution of application symbol count underrun values comprises transmitting the distribution for a particular type of file received.

22. The method of claim 21, wherein transmitting the distribution of application symbol count underrun values comprises transmitting a plurality of distributions, wherein each distribution corresponds to a different type of file received.

23. The method of claim 11, wherein generating the metric comprises determining an application symbol count underrun percent value of (k−n)/k for each failed block and related object size range in application symbols.

24. A method for providing reception reporting information in a wireless communication system, comprising:
receiving a particular data file containing a plurality of application symbols;
determining a number (n) of application symbols received in the file;
determining a total number (k) of application symbols transmitted in the file;
generating a metric based on the number (n) of application symbols received in the file and the total number (k) of applications symbols transmitted in the file; and
transmitting the metric to a server.

25. The method of either of claim 24, wherein generating the metric based on the number of application symbols received comprises generating the metric based on the number (n) of application symbols received and the total number (k) of application symbols in the file or during a specified period of time.

26. The method of claim 25, wherein the specified period of time or range of times is defined in a service announcement associated with the file transmission.

27. The method of claim 25, wherein generating the metric comprises logging pairs of n and k for the file or during the specified period of time, and wherein transmitting the metric comprises transmitting pairs of (n, k) values for the file or during the specified period of time.

28. The method of claim 25, wherein generating the metric comprises determining an application symbol count underrun value of (k−n) for the file or during the specified period of time.

29. The method of claim 28, wherein transmitting the metric comprises transmitting a distribution of application symbol count underrun values for the file or during the specified period of time.

30. The method of claim 29, wherein transmitting the distribution of application symbol count underrun values comprises transmitting the distribution over a specified range between a maximum application symbol count underrun value and a minimum application symbol count underrun value.

31. The method of claim 30, wherein in the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

32. The method of claim 31, wherein transmitting the distribution of application symbol count underrun values comprises transmitting the distribution over a specified range of file sizes received.

33. The method of claim 32, wherein transmitting the distribution of application symbol count underrun values comprises transmitting a plurality of distributions, wherein each distribution corresponds to a different range of file sizes received.

34. The method of claim 29, wherein transmitting the distribution of application symbol count underrun values comprises transmitting the distribution for a particular type of file received.

35. The method of claim 34, wherein transmitting the distribution of application symbol count underrun values comprises transmitting a plurality of distributions, wherein each distribution corresponds to a different type of file received.

36. The method of claim 27, wherein generating the metric comprises determining an application symbol count underrun percent value of (k−n)/k for the file or during the specified period of time.

37. The method of any of claim 24, further comprising:
transmitting location data to the server in association with the metric.

38. A receiver device, comprising:
a receiver circuit configured to receive wireless transmissions;
a transceiver configured to establish a wireless data link with a network; and
a processor coupled to the receiver circuit and the transceiver, wherein the processor is configured with processor executable instructions to:
receive a plurality of application symbols within a file transmitted by a wireless communication system;

determine a number (n) of application symbols received in the file and a total number (k) of applications symbols transmitted in the file;

generate a metric based on the number (n) of application symbols received in the file and the total number (k) of applications symbols transmitted in the file; and transmit the metric to a server.

39. The receiver device of claim 38, wherein the processor is configured with processor executable instructions to:
transmit location data to the server in association with the metric.

40. The receiver device of claim 38, wherein the processor is configured with processor executable instructions to perform operations such that generating the metric comprises logging pairs of n and k for the file.

41. The receiver device of claim 38, wherein the processor is configured with processor executable instructions to perform operations such that generating the metric comprises determining an application symbol count underrun value of (k−n) for the file.

42. The receiver device of claim 41, wherein the processor is configured with processor executable instructions to perform operations such that transmitting the metric comprises transmitting a distribution of application symbol count underrun values for files received during a specified measurement period.

43. The receiver device of claim 42, wherein the means for transmitting the distribution of application symbol count underrun values comprises means for transmitting the distribution for a particular type of file received.

44. The receiver device of claim 42, wherein the processor is configured with processor executable instructions to perform operations such that transmitting the distribution of application symbol count underrun values comprises transmitting the distribution over a specified range between a maximum application symbol count underrun value and a minimum application symbol count underrun value.

45. The receiver device of claim 44, wherein the processor is configured with processor executable instructions to perform operations such that the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

46. The receiver device of claim 42, wherein the processor is configured with processor executable instructions to perform operations such that transmitting the distribution of application symbol count underrun values comprises transmitting a plurality of distributions, wherein each distribution corresponds to a different range of file sizes received.

47. The receiver device of claim 42, wherein the processor is configured with processor executable instructions to perform operations such that transmitting the distribution of application symbol count underrun values comprises transmitting the distribution for a particular type of file received.

48. The receiver device of claim 47, wherein the processor is configured with processor executable instructions to perform operations such that transmitting the distribution of application symbol count underrun values comprises transmitting a plurality of distributions, wherein each distribution corresponds to a different type of file received.

49. The receiver device of claim 47, wherein the means for transmitting the distribution of application symbol count underrun values comprises means for transmitting a plurality of distributions, wherein each distribution corresponds to a different type of file received.

50. The receiver device of claim 38, wherein:
the file is comprised of a plurality of data blocks each comprising a plurality of application symbols;
the processor is configured with processor executable instructions to:
identify data blocks that were not successfully received;
determining the number of application symbols received in the file comprises determining the number of application symbols received in each data block that was not successfully received; and
generating the metric based on the number of application symbols received in the file comprises generating the metric based on the number of application symbols received in each data block that was not successfully received.

51. The receiver device of claim 50, wherein the processor is configured with processor executable instructions to perform operations such that generating the metric comprises determining an application symbol count underrun percent value of (k−n)/k for each failed block and related object size range in application symbols.

52. The receiver device of claim 50, wherein the processor is configured with processor executable instructions to perform operations further comprising determining a total number of application symbols in each data block that was not successfully received,
wherein the processor is configured with processor executable instructions to perform operations such that generating the metric based on the number of application symbols received in each data block that was not successfully received comprises generating the metric based on the number of application symbols received and the total number of application symbols in each data block that was not successfully received.

53. The receiver device of claim 50, wherein the processor is configured with processor executable instructions to:
generate the metric by logging pairs of n and k for each data block that was not successfully received; and
transmit the metric comprises transmitting pairs of (n, k) values for each data block that was not successfully received.

54. The receiver device of claim 50, wherein the processor is configured with processor executable instructions to perform operations such that generating the metric comprises determining an application symbol count underrun value of (k−n) for each failed block.

55. The receiver device of claim 50, wherein the processor is configured with processor executable instructions to perform operations such that transmitting the metric comprises transmitting a distribution of application symbol count underrun values for data blocks not successfully received during a specified measurement period.

56. The receiver device of claim 55, wherein the processor is configured with processor executable instructions to perform operations such that transmitting the distribution of application symbol count underrun values comprises transmitting the distribution over a specified range between a maximum application symbol count underrun value and a minimum application symbol count underrun value.

57. The receiver device of claim 56, wherein the processor is configured with processor executable instructions to perform operations such that the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

58. The receiver device of claim 55, wherein the processor is configured with processor executable instructions to perform operations such that transmitting the distribution of application symbol count underrun values comprises restricting distribution samples to failed blocks in a specified range of file sizes received.

59. The receiver device of claim 58, wherein the processor is configured with processor executable instructions to perform operations such that transmitting the distribution of application symbol count underrun values comprises transmitting a plurality of distributions, wherein each distribution corresponds to a different range of file sizes received.

60. The receiver device of claim 55, wherein the processor is configured with processor executable instructions to perform operations such that transmitting the distribution of application symbol count underrun values comprises transmitting the distribution for a particular type of file received.

61. The receiver device of claim 60, wherein the processor is configured with processor executable instructions to perform operations such that transmitting the distribution of application symbol count underrun values comprises transmitting a plurality of distributions, wherein each distribution corresponds to a different type of file received.

62. The receiver device of claim 38, wherein the processor is configured with processor executable instructions to perform operations such that generating the metric comprises determining an application symbol count underrun percent value of (k−n)/k for each failed block and related object size range in application symbols.

63. A receiver device, comprising:
means for receiving a plurality of application symbols within a file transmitted by a wireless communication system;
means for determining a number (n) of application symbols received in the file and a total number (k) of applications symbols transmitted in the file;
means for generating a metric based on the number (n) of application symbols received in the file and the total number (k) of applications symbols transmitted in the file; and
means for transmitting the metric to a server.

64. The receiver device of claim 63, further comprising:
means for transmitting location data to the server in association with the metric.

65. The receiver device of claim 63, wherein the means for generating the metric comprises means for logging pairs of n and k for the file.

66. The receiver device of claim 63, wherein the means for generating the metric comprises means for determining an application symbol count underrun value of (k−n) for the file.

67. The receiver device of claim 66, wherein the means for transmitting the metric comprises means for transmitting a distribution of application symbol count underrun values for files received during a specified measurement period.

68. The receiver device of claim 67, wherein the means for transmitting the distribution of application symbol count underrun values comprises means for transmitting the distribution over a specified range between a maximum application symbol count underrun value and a minimum application symbol count underrun value.

69. The receiver device of claim 68, wherein the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

70. The receiver device of claim 67, wherein the means for transmitting the distribution of application symbol count underrun values comprises means for transmitting a plurality of distributions, wherein each distribution corresponds to a different range of file sizes received.

71. The receiver device of claim 63, wherein:
the file is comprised of a plurality of data blocks each comprising a plurality of application symbols;
the receiver further comprises means for identifying data blocks that were not successfully received; and
the means for determining the number of application symbols received in the file comprises means for determining the number of application symbols received in each data block that was not successfully received; and
the means for generating the metric based on the number of application symbols received in the file comprises means for generating the metric based on the number of application symbols received in each data block that was not successfully received.

72. The receiver device of claim 71, wherein the means for generating the metric comprises means for determining an application symbol count underrun percent value of (k−n)/k for each failed block and related object size range in application symbols.

73. The receiver device of claim 71, further comprising means for determining a total number of application symbols in each data block that was not successfully received, wherein means for generating the metric based on the number of application symbols received in each data block that was not successfully received comprises means for generating the metric based on the number of application symbols received and the total number of application symbols in each data block that was not successfully received.

74. The receiver device of claim 71, wherein:
the means for generating the metric comprises means for logging pairs of n and k for each data block that was not successfully received; and
the means for transmitting the metric comprises means for transmitting pairs of (n, k) values for each data block that was not successfully received.

75. The receiver device of claim 71, wherein the means for generating the metric comprises means for determining an application symbol count underrun value of (k−n) for each failed block.

76. The receiver device of claim 71, wherein the means for transmitting the metric comprises means for transmitting a distribution of application symbol count underrun values for data blocks not successfully received during a specified measurement period.

77. The receiver device of claim 76, wherein the means for transmitting the distribution of application symbol count underrun values comprises means for transmitting the distribution over a specified range between a maximum application symbol count underrun value and a minimum application symbol count underrun value.

78. The receiver device of claim 77, wherein the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

79. The receiver device of claim 76, wherein the means for transmitting the distribution of application symbol count underrun values comprises means for restricting distribution samples to failed blocks in a specified range of file sizes received.

80. The receiver device of claim 79, wherein the means for transmitting the distribution of application symbol count underrun values comprises means for transmitting a plurality of distributions, wherein each distribution corresponds to a different range of file sizes received.

81. The receiver device of claim 76, wherein the means for transmitting the distribution of application symbol count underrun values comprises means for transmitting the distribution for a particular type of file received.

82. The receiver device of claim 81, wherein the means for transmitting the distribution of application symbol count underrun values comprises means for transmitting a plurality of distributions, wherein each distribution corresponds to a different type of file received.

83. The receiver device of claim 63, wherein the means for generating the metric comprises means for determining an application symbol count underrun percent value of (k−n)/k for each failed block and related object size range in application symbols.

84. A non-transitory processor-readable storage medium having stored thereon processor-executable instructions configured to cause a processor of a receiver device to:
   receive a plurality of application symbols within a file transmitted by a wireless communication system;
   determine a number (n) of application symbols received in the file and a total number (k) of applications symbols transmitted in the file;
   generate a metric based on the number (n) of application symbols received in the file and the total number (k) of applications symbols transmitted in the file; and
   transmit the metric to a server.

85. The non-transitory processor-readable storage medium of claim 84, wherein the stored processor executable instructions are configured to cause the processor of the receiver device to:
   transmit location data to the server in association with the metric.

86. The non-transitory processor-readable storage medium of claim 84, wherein the stored processor executable instructions are configured to cause the processor of the receiver device to perform operations such that generating the metric comprises logging pairs of n and k for the file.

87. The non-transitory processor-readable storage medium of claim 84, wherein the stored processor executable instructions are configured to cause the processor of the receiver device to perform operations such that generating the metric comprises determining an application symbol count underrun value of (k−n) for the file.

88. The non-transitory processor-readable storage medium of claim 87, wherein the stored processor executable instructions are configured to cause the processor of the receiver device to perform operations such that transmitting the metric comprises transmitting a distribution of application symbol count underrun values for files received during a specified measurement period.

89. The non-transitory processor-readable storage medium of claim 88, wherein the stored processor executable instructions are configured to cause the processor of the receiver device to perform operations such that transmitting the distribution of application symbol count underrun values comprises transmitting the distribution over a specified range between a maximum application symbol count underrun value and a minimum application symbol count underrun value.

90. The non-transitory processor-readable storage medium of claim 89, wherein the stored processor executable instructions are configured to cause the processor of the receiver device to perform operations such that the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

91. The non-transitory processor-readable storage medium of claim 88, wherein the stored processor executable instructions are configured to cause the processor of the receiver device to perform operations such that transmitting the distribution of application symbol count underrun values comprises transmitting a plurality of distributions, wherein each distribution corresponds to a different range of file sizes received.

92. The non-transitory processor-readable storage medium of claim 88, wherein the stored processor executable instructions are configured to cause the processor of the receiver device to perform operations such that transmitting the distribution of application symbol count underrun values comprises transmitting the distribution for a particular type of file received.

93. The non-transitory processor-readable storage medium of claim 92, wherein the stored processor executable instructions are configured to cause the processor of the receiver device to perform operations such that transmitting the distribution of application symbol count underrun values comprises transmitting a plurality of distributions, wherein each distribution corresponds to a different type of file received.

94. The non-transitory processor-readable storage medium of claim 84, wherein:
   the file is comprised of a plurality of data blocks each comprising a plurality of application symbols;
   the stored processor executable instructions are configured to cause the processor of the receiver device to:
      identify data blocks that were not successfully received; and
      determine the number of application symbols received in the file comprises determining the number of application symbols received in each data block that was not successfully received; and
      generate the metric based on the number (n) of application symbols received in the file comprises generating the metric based on the number of application symbols received in each data block that was not successfully received.

95. The non-transitory processor-readable storage medium of claim 94, wherein the stored processor executable instructions are configured to cause the processor of the receiver device to perform operations such that generating the metric comprises determining an application symbol count underrun percent value of (k−n)/k for each failed block and related object size range in application symbols.

96. The non-transitory processor-readable storage medium of claim 94, wherein the stored processor executable instructions are configured to cause the processor of the receiver device to perform operations further comprising determining a total number of application symbols in each data block that was not successfully received, wherein the stored processor executable instructions are configured to cause the processor of the receiver device to perform operations such that generating the metric based on the number of application symbols received in each data block that was not successfully received comprises generating the metric based on the number of application symbols received and the total number of application symbols in each data block that was not successfully received.

97. The non-transitory processor-readable storage medium of claim 94, wherein the stored processor executable instructions are configured to cause the processor of the receiver device to:

generate the metric comprises logging pairs of n and k for each data block that was not successfully received; and transmit the metric comprises transmitting pairs of (n, k) values for each data block that was not successfully received.

98. The non-transitory processor-readable storage medium of claim 94, wherein the stored processor executable instructions are configured to cause the processor of the receiver device to perform operations such that generating the metric comprises determining an application symbol count underrun value of (k–n) for each failed block.

99. The non-transitory processor-readable storage medium of claim 94, wherein the stored processor executable instructions are configured to cause the processor of the receiver device to perform operations such that transmitting the metric comprises transmitting a distribution of application symbol count underrun values for data blocks not successfully received during a specified measurement period.

100. The non-transitory processor-readable storage medium of claim 99, wherein the stored processor executable instructions are configured to cause the processor of the receiver device to perform operations such that transmitting the distribution of application symbol count underrun values comprises transmitting the distribution over a specified range between a maximum application symbol count underrun value and a minimum application symbol count underrun value.

101. The non-transitory processor-readable storage medium of claim 100, wherein the stored processor executable instructions are configured to cause the processor of the receiver device to perform operations such that the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

102. The non-transitory processor-readable storage medium of claim 99, wherein the stored processor executable instructions are configured to cause the processor of the receiver device to perform operations such that transmitting the distribution of application symbol count underrun values comprises restricting distribution samples to failed blocks in a specified range of file sizes received.

103. The non-transitory processor-readable storage medium of claim 102, wherein the stored processor executable instructions are configured to cause the processor of the receiver device to perform operations such that transmitting the distribution of application symbol count underrun values comprises transmitting a plurality of distributions, wherein each distribution corresponds to a different range of file sizes received.

104. The non-transitory processor-readable storage medium of claim 99, wherein the stored processor executable instructions are configured to cause the processor of the receiver device to perform operations such that transmitting the distribution of application symbol count underrun values comprises transmitting the distribution for a particular type of file received.

105. The non-transitory processor-readable storage medium of claim 104, wherein the stored processor executable instructions are configured to cause the processor of the receiver device to perform operations such that transmitting the distribution of application symbol count underrun values comprises transmitting a plurality of distributions, wherein each distribution corresponds to a different type of file received.

106. The non-transitory processor-readable storage medium of claim 84, wherein the stored processor executable instructions are configured to cause the processor of the receiver device to perform operations such that generating the metric comprises determining an application symbol count underrun percent value of (k–n)/k for each failed block and related object size range in application symbols.

107. A receiver device, comprising:
a receiver circuit configured to receive wireless transmissions;
a transceiver configured to establish a wireless data link with a network; and
a processor coupled to the receiver circuit and the transceiver, wherein the processor is configured with processor executable instructions to:
receive a particular data file containing a plurality of application symbols;
determine a number (n) of application symbols received in the file;
determine a total number (k) of application symbols transmitted in the file;
generate a metric based on the number (n) of application symbols received in the file and the total number (k) of applications symbols transmitted in the file; and
transmit the metric to a server.

108. The receiver device of claim 107, wherein the processor is configured with processor executable instructions to perform operations such that generating the metric based on the number of application symbols received comprises generating the metric based on the number (n) of application symbols received and the total number (k) of application symbols in the file or during a specified period of time.

109. The receiver device of claim 108, wherein the processor is configured with processor executable instructions to perform operations such that the specified period of time or range of times is defined in a service announcement associated with the file transmission.

110. The receiver device of claim 108, wherein the processor is configured with processor executable instructions to perform operations such that generating the metric comprises logging pairs of n and k for the file or during the specified period of time, and wherein transmitting the metric comprises transmitting pairs of (n, k) values for the file or during the specified period of time.

111. The receiver device of claim 108, wherein the processor is configured with processor executable instructions to perform operations such that generating the metric comprises determining an application symbol count underrun value of (k−n) for the file or during the specified period of time.

112. The receiver device of claim 111, wherein the processor is configured with processor executable instructions to perform operations such that transmitting the metric comprises transmitting a distribution of application symbol count underrun values for the file or during the specified period of time.

113. The receiver device of claim 112, wherein the processor is configured with processor executable instructions to perform operations such that transmitting the distribution of application symbol count underrun values comprises transmitting the distribution over a specified range between a maximum application symbol count underrun value and a minimum application symbol count underrun value.

114. The receiver device of claim 113, wherein the processor is configured with processor executable instructions to perform operations such that in the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

115. The receiver device of claim 114, wherein the processor is configured with processor executable instructions to perform operations such that transmitting the distribution of application symbol count underrun values comprises transmitting the distribution over a specified range of file sizes received.

116. The receiver device of claim 115, wherein the processor is configured with processor executable instructions to perform operations such that transmitting the distribution of application symbol count underrun values comprises transmitting a plurality of distributions, wherein each distribution corresponds to a different range of file sizes received.

117. The receiver device of claim 112, wherein the processor is configured with processor executable instructions to perform operations such that transmitting the distribution of application symbol count underrun values comprises transmitting the distribution for a particular type of file received.

118. The receiver device of claim 117, wherein the processor is configured with processor executable instructions to perform operations such that transmitting the distribution of application symbol count underrun values comprises transmitting a plurality of distributions, wherein each distribution corresponds to a different type of file received.

119. The receiver device of claim 112, wherein the processor is configured with processor executable instructions to perform operations such that generating the metric comprises determining an application symbol count underrun percent value of (k−n)/k for the file or during the specified period of time.

120. The receiver device of any of claim 107, wherein the processor is configured with processor executable instructions to:
transmit location data to the server in association with the metric.

121. A receiver device, comprising:
means for receiving a particular data file containing a plurality of application symbols;
means for determining a number (n) of application symbols received in the file;
means for determining a total number (k) of application symbols transmitted in the file;
means for generating a metric based on the number (n) of application symbols received in the file and the total number (k) of applications symbols transmitted in the file; and
means for transmitting the metric to a server.

122. The receiver device of claim 121, wherein the means for generating the metric based on the number of application symbols received comprises means for generating the metric based on the number (n) of application symbols received and the total number (k) of application symbols in the file or during a specified period of time.

123. The receiver device of claim 122, wherein the specified period of time or range of times is defined in a service announcement associated with the file transmission.

124. The receiver device of claim 122, wherein the means for generating the metric comprises means for logging pairs of n and k for the file or during the specified period of time, and wherein transmitting the metric comprises transmitting pairs of (n, k) values for the file or during the specified period of time.

125. The receiver device of claim 122, wherein the means for generating the metric comprises means for determining an application symbol count underrun value of (k−n) for the file or during the specified period of time.

126. The receiver device of claim 125, wherein the means for transmitting the metric comprises means for transmitting a distribution of application symbol count underrun values for the file or during the specified period of time.

127. The receiver device of claim 126, wherein the means for transmitting the distribution of application symbol count underrun values comprises means for transmitting the distribution over a specified range between a maximum application symbol count underrun value and a minimum application symbol count underrun value.

128. The receiver device of claim 127, wherein the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

129. The receiver device of claim 128, wherein the means for transmitting the distribution of application symbol count underrun values comprises means for transmitting the distribution over a specified range of file sizes received.

130. The receiver device of claim 129, wherein the means for transmitting the distribution of application symbol count underrun values comprises means for transmitting a plurality of distributions, wherein each distribution corresponds to a different range of file sizes received.

131. The receiver device of claim 126, wherein the means for transmitting the distribution of application symbol count underrun values comprises means for transmitting the distribution for a particular type of file received.

132. The receiver device of claim 131, wherein the means for transmitting the distribution of application symbol count underrun values comprises means for transmitting a plurality of distributions, wherein each distribution corresponds to a different type of file received.

133. The receiver device of claim 126, wherein the means for generating the metric comprises means for determining an application symbol count underrun percent value of (k−n)/k for the file or during the specified period of time.

134. The receiver device of any of claim 121, further comprising:
means for transmitting location data to the server in association with the metric.

135. A non-transitory processor-readable storage medium having stored thereon processor-executable instructions configured to cause a processor of a receiver device to:
receive a file containing a plurality of application symbols;
determine a number (n) of application symbols received in the file;
determine a total number (k) of application symbols transmitted in the file;
generate a metric based on the number (n) of application symbols received in the file and the total number (k) of applications symbols transmitted in the file; and
transmit the metric to a server.

136. The non-transitory processor-readable storage medium of claim 135, wherein the stored processor executable instructions are configured to cause the processor of the receiver device to perform operations such that generating the metric based on the number of application symbols received comprises generating the metric based on the number (n) of application symbols received and the total number (k) of application symbols in the file or during a specified period of time.

137. The non-transitory processor-readable storage medium of claim 136, wherein the stored processor executable instructions are configured to cause the processor of the receiver device to perform operations such that the specified period of time or range of times is defined in a service announcement associated with the file transmission.

138. The non-transitory processor-readable storage medium of claim 136, wherein the stored processor executable instructions are configured to cause the processor of the receiver device to perform operations such that generating the metric comprises logging pairs of n and k for the file or during the specified period of time, and wherein transmitting the metric comprises transmitting pairs of (n, k) values for the file or during the specified period of time.

139. The non-transitory processor-readable storage medium of claim 136, wherein the stored processor executable instructions are configured to cause the processor of the receiver device to perform operations such that generating the metric comprises determining an application symbol count underrun value of (k−n) for the file or during the specified period of time.

140. The non-transitory processor-readable storage medium of claim 139, wherein the stored processor executable instructions are configured to cause the processor of the receiver device to perform operations such that transmitting the metric comprises transmitting a distribution of application symbol count underrun values for the file or during the specified period of time.

141. The non-transitory processor-readable storage medium of claim 140, wherein the stored processor executable instructions are configured to cause the processor of the receiver device to perform operations such that transmitting the distribution of application symbol count underrun values comprises transmitting the distribution over a specified range between a maximum application symbol count underrun value and a minimum application symbol count underrun value.

142. The non-transitory processor-readable storage medium of claim 141, wherein the stored processor executable instructions are configured to cause the processor of the receiver device to perform operations such that in the distribution of application symbol count underrun values exceeding the maximum application symbol count underrun value are reported at the maximum application symbol count underrun value and application symbol count underrun values below the minimum application symbol count underrun value are reported at the minimum application symbol count underrun value.

143. The non-transitory processor-readable storage medium of claim 142, wherein the stored processor executable instructions are configured to cause the processor of the receiver device to perform operations such that transmitting the distribution of application symbol count underrun values comprises transmitting the distribution over a specified range of file sizes received.

144. The non-transitory processor-readable storage medium of claim 143, wherein the stored processor executable instructions are configured to cause the processor of the receiver device to perform operations such that transmitting the distribution of application symbol count underrun values comprises transmitting a plurality of distributions, wherein each distribution corresponds to a different range of file sizes received.

145. The non-transitory processor-readable storage medium of claim 140, wherein the stored processor executable instructions are configured to cause the processor of the receiver device to perform operations such that transmitting the distribution of application symbol count underrun values comprises transmitting the distribution for a particular type of file received.

146. The non-transitory processor-readable storage medium of claim 145, wherein the stored processor executable instructions are configured to cause the processor of the receiver device to perform operations such that transmitting the distribution of application symbol count underrun values comprises transmitting a plurality of distributions, wherein each distribution corresponds to a different type of file received.

147. The non-transitory processor-readable storage medium of claim 140, wherein the stored processor executable instructions are configured to cause the processor of the receiver device to perform operations such that generating the metric comprises determining an application symbol count underrun percent value of (k−n)/k for the file or during the specified period of time.

148. The non-transitory processor-readable storage medium of any of claim 135, wherein the stored processor executable instructions are configured to cause the processor of the receiver device to:
transmit location data to the server in association with the metric.

* * * * *